US006381379B1

(12) United States Patent
Burns

(10) Patent No.: US 6,381,379 B1
(45) Date of Patent: Apr. 30, 2002

(54) OPTICAL MODULATOR HAVING COPLANAR ELECTRODES FOR CONTROLLING CHIRP

(75) Inventor: William K. Burns, Alexandria, VA (US)

(73) Assignee: Codeon Corporation, Columbia, MD (US)

(*) Notice: Subject to any disclaimer, the term of this patent is extended or adjusted under 35 U.S.C. 154(b) by 0 days.

(21) Appl. No.: 09/501,644

(22) Filed: Feb. 10, 2000

(51) Int. Cl.[7] .............................................. G02F 1/0355
(52) U.S. Cl. ............................... 385/2; 385/8; 385/131; 385/14; 359/238
(58) Field of Search ........................ 385/2, 3, 8, 9, 385/14, 129, 130, 131; 359/238

(56) References Cited

U.S. PATENT DOCUMENTS

| 5,074,631 | A | | 12/1991 | Hamano et al. ............... 385/3 |
| 5,303,079 | A | | 4/1994 | Gnauck et al. ............. 359/188 |
| 5,408,544 | A | | 4/1995 | Seino ............................ 385/3 |
| 5,422,966 | A | * | 6/1995 | Gopalakrishnan et al. ...... 385/2 |
| 5,787,211 | A | * | 7/1998 | Gopalakrishnan .............. 385/2 |
| 5,991,491 | A | * | 11/1999 | Madabhushi ................. 385/31 |

FOREIGN PATENT DOCUMENTS

| EP | 0669546 A3 | 2/1995 | ........... G02F/1/035 |
| EP | 0669546 A2 | 2/1995 | ........... G02F/1/035 |
| JP | 05210072 | 8/1993 | ........... G02F/1/035 |
| JP | 06235891 | 8/1994 | ........... G02F/1/035 |
| WO | WO 9636901 | 11/1996 | ........... G02F/1/035 |

OTHER PUBLICATIONS

Germany; Journal of Optical Communications—Analysis of asymmetric coplanar strip electrodes with a buffer layer in integrated–optics electrooptics devices; by Jin–Shin Lin, The–Nan Chang, Wei–Yu Lee; Apr. 16, 1995; p. 48–53.

United States; Journal of Lightwave Technology—Overlap integral factors in integrated optic modulators and switches; by C.M. Kim, R.V. Ramaswamy; Jul. 07, 1989; p. 1063–1070.

P. Jiang et al., "LiNbO$_3$ Mach–Zehnder Modulators with Fixed Negative Chirp", IEEE Photonics Technology Letters, vol. 8, No. 10, Oct. 1996, pp. 1319–1321.

A. H. Gnauck et al., "Dispersion Penalty Reduction Using an Optical Modulator with Adjustable Chirp", IEEE Photonics Technology Letters, vol. 3, No. 1, Oct. 1991, pp. 916–918.

* cited by examiner

Primary Examiner—Cassandra Spyrou
Assistant Examiner—Fayez Assai
(74) Attorney, Agent, or Firm—Morgan, Lewis & Bockius LLP

(57) ABSTRACT

An optical modulator includes a substrate having an electrooptic effect, an optical waveguide having first and second cascading portions in the substrate, and transmitting an optical field, a first coplanar strip electrode having a first part over the first cascading portion and second and third parts extending beyond the first cascading portion, wherein the first part is approximately perpendicular to the second and third parts and has a width substantially the same as the first cascading portion, a second coplanar strip electrode having a first part over the second cascading portion and second and third parts to extend beyond the second cascading portion, and the first part being approximately perpendicular to the second and third parts, and a voltage source supplying a voltage to the first coplanar strip electrode, wherein the second coplanar strip electrode is grounded and is symmetrical to the first coplanar strip electrode.

12 Claims, 9 Drawing Sheets

OPTICAL MODULATOR HAVING COPLANAR ELECTRODES FOR CONTROLLING CHIRP

BACKGROUND OF THE INVENTION

1. Field of the Invention

The present invention relates to an optical modulator, and more particularly, to an optical modulator having coplanar electrodes for controlling chirp. Although the present invention is suitable for a wide scope of applications, it is particularly suitable for controlling a chirp in operating an optical modulator.

2. Discussion of the Related Art

An integrated optical modulator is of great interest in operating a fiber optical communication system in the range of 2.5 to 10 Gbps (Giga bits per second), and potentially 40 Gbps or above. A great deal of research has been carried out to quantify signal frequency broadening for different types of modulation. This effect is known as chirp. Chirp can cause loss of signal fidelity after propagating down the optical fiber due to a wavelength dispersion. In other words, chirp interacts with the dispersion profile of the transmission fiber to severely limit the distance over which error-free data propagation is possible.

There has been an effort to provide either fixed (zero or non-zero) or variable chirp by varying an arrangement of the system. Generation of chirp is system dependent, and it may include zero chirp, variable chirp, or chirp at a fixed non-zero value. Generally, modulators with variable chirp are more complicated, or require a more complex electrical driving scheme than fixed chirp modulators.

A conventional approach to control a chirp in external modulators has been to use an amplitude modulator and a phase modulator in series. The modulators are driven with adjustable voltages or pre-selected electrode lengths are used to obtain a desired value of chirp. A disadvantage of this approach is that the series configuration of the modulators generally leads to higher drive voltages due to a limited device length. Similar control of chirp can be obtained in a single Mach Zehnder amplitude modulator in which the arms of the interferometer are driven with independent drive voltages with adjustable amplitude and phase. A drive voltage or a voltage required to turn the modulator from an off-state to an on-state is one of the important features for external modulators. By minimizing the voltage, the drive power required to operate the modulator can be minimized.

For Mach Zehnder amplitude modulators biased at their quadrature or linearly operating point, zero chirp can be obtained by driving the arms of the interferometer in a symmetrical fashion, so that the light in each arm receives equal and opposite phase shifts. One way to achieve this feature is to apply equal and oppositely directed electric fields to each arm of the interferometer, while ensuring that the electro-optic overlap integrals are the same for each arm. Fixed non-zero chirp may be created by varying a magnitude of the field, a magnitude of the overlap integral, or both in one of the interferometer arms. Nonetheless, it is difficult to achieve zero or fixed non-zero chirp parameter in the conventional way.

SUMMARY OF THE INVENTION

Accordingly, the present invention is directed to an optical modulator having coplanar electrodes for controlling a chirp that substantially obviates one or more problems due to limitations and disadvantages of the related art.

Another object of the present invention is to provide an optical modulator controlling a chirp in operating an optical communication system.

Additional features and advantages of the invention will be set forth in the description which follows and in part will be apparent from the description, or may be learned by practice of the invention. The objectives and other advantages of the invention will be realized and attained by the structure particularly pointed out in the written description and claims hereof as well as the appended drawings.

To achieve these and other advantages and in accordance with the purpose of the present invention, as embodied and broadly described, an optical modulator includes a substrate having an electrooptic effect, an optical waveguide having first and second cascading portions in the substrate, and transmitting an optical field, a first coplanar strip electrode having a first part over the first cascading portion and second and third parts extending beyond the first cascading portion, wherein the first part is approximately perpendicular to the second and third parts and has a width substantially the same as the first cascading portion, a second coplanar strip electrode having a first part over the second cascading portion and second and third parts to extend beyond the second cascading portion, and the first part being approximately perpendicular to the second and third parts, and a voltage source supplying a voltage to the first coplanar strip electrode, wherein the second coplanar strip electrode is grounded and is symmetrical to the first coplanar strip electrode.

In another aspect of the present invention, an optical modulator includes a substrate having an electrooptic effect, an optical waveguide having first and second cascading portions in the substrate, and transmitting an optical field, a first coplanar waveguide electrode having first, second and third parts, wherein the first part is approximately perpendicular to the second and third parts and does not overlap the first and second cascading portions, a second coplanar waveguide electrode having a first part over the first cascading portion and second and third parts extending beyond the first cascading portion, wherein the first part is approximately perpendicular to the second and third parts, a third coplanar waveguide electrode having a shape symmetric to the first coplanar waveguide electrode and separated apart from the second coplanar waveguide electrode by a distance the same as the distance between the first and second coplanar waveguide electrodes, and a voltage source supplying a voltage to the second coplanar waveguide electrode, wherein the first and third coplanar waveguide electrodes are grounded, so that electrooptic overlap integrals of each cascading portion of the optical waveguide are different, thereby generating a fixed non-zero amount of a modulation chirp parameter.

In another aspect of the present invention, an optical modulator includes a substrate having an electrooptic effect, an optical waveguide having first and second cascading portions in the substrate, and transmitting an optical field, a first coplanar waveguide electrode having first, second and third parts, wherein the first part is approximately perpendicular to the second and third parts and does not overlap the first and second cascading portions, and has a width substantially greater that the first and second cascading portions, a second coplanar waveguide electrode having a first part over the first cascading portion and second and third parts extending beyond the first cascading portion, wherein the first part is approximately perpendicular to the second and third parts, a third coplanar waveguide electrode having a shape symmetric to the first coplanar waveguide electrode and separated apart from the second coplanar waveguide electrode by a distance the same as the distance between the first and second coplanar waveguide electrodes, wherein the first parts of the first and third coplanar waveguide electrodes have a width substantially greater than that of the second coplanar waveguide electrode, and a voltage source supplying a voltage to the second coplanar waveguide electrode, wherein the first and third coplanar waveguide electrodes are grounded, so that electrooptic overlap integrals of each cascading portion of the optical waveguide is different, thereby generating a fixed non-zero amount of a modulation chirp parameter.

In a further aspect of the present invention, an optical modulator includes a substrate having an electrooptic effect, an optical waveguide having first and second cascading portions in the substrate, and transmitting an optical field, a first coplanar waveguide electrode having a first part over the second cascading portion and second and third parts extending beyond the second cascading portion, wherein the first part is approximately perpendicular to the second and third parts, a second coplanar waveguide electrode having a first part over the first cascading portion and second and third parts extending beyond the first cascading portion, wherein the first part is approximately perpendicular to the second and third parts, a third coplanar waveguide electrode having a shape symmetric to the first coplanar waveguide electrode and separated apart from the second coplanar waveguide electrode by a distance the same as the distance between the first and second coplanar waveguide electrodes, a fourth coplanar waveguide electrode having a shape symmetric to the first coplanar waveguide electrode, and having a first part over the second cascading portion and being in contact with the first part of the first coplanar waveguide electrode, a fifth coplanar waveguide electrode having a shape symmetric to the second coplanar waveguide electrode and separated apart from the fourth coplanar waveguide electrode by a distance the same as the distance between the first and second coplanar waveguide electrodes, a sixth coplanar waveguide electrode having a shape symmetric to the third coplanar waveguide electrode and separated apart from the fifth coplanar waveguide electrode by a distance the same as the distance between the second and third coplanar waveguide electrodes, and a voltage source supplying a voltage to the second and fifth coplanar waveguide electrodes, wherein the first, third, fourth, and sixth coplanar waveguide electrodes are grounded.

It is to be understood that both the foregoing general description and the following detailed description are exemplary and explanatory and are intended to provide further explanation of the invention as claimed.

BRIEF DESCRIPTION OF THE DRAWINGS

The accompanying drawings, which are included to provide a further understanding of the invention and are incorporated in and constitute a part of this application, illustrate embodiments of the invention and together with the description serve to explain the principle of the invention.

In the drawings.

DETAILED DESCRIPTION OF THE PREFERRED EMBODIMENTS

Reference will now be made in detail to the preferred embodiments of the present invention, examples of which are illustrated in the accompanying drawings. Wherever possible, the same reference numbers will be used throughout the drawings to refer to the same or like parts.

Figure 1:
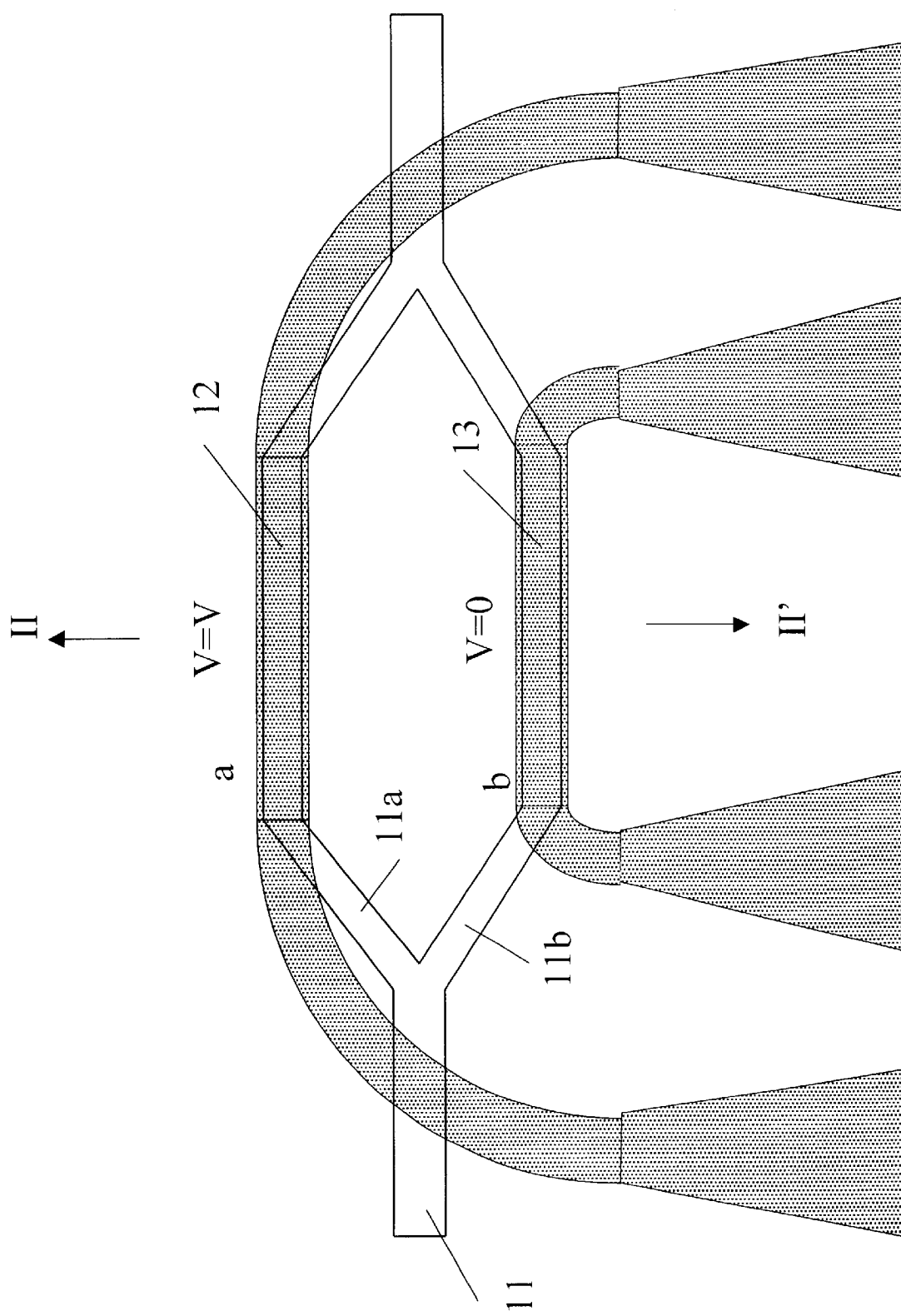
FIG. 1 is a top view of a Mach Zehnder interferometer type modulator having a two coplanar strip electrode structure driven by a single drive voltage for a zero amount of a modulation chirp parameter according to a first embodiment of the present invention.

Initially referring to FIG. 1, a Mach Zehnder interferometer type modulator, with two coplanar strip electrodes for a zero amount of a modulation chirp parameter according to a first embodiment of the present invention, requires only a single drive voltage. In the present invention, an externally modulated system using a Z-cut $LiNbO_3$ substrate is considered due to a lower drive voltage that can generally be obtained with the Z-axis crystal orientation. Thus, fixed or minimally tunable chirp modulators are available in the present invention. The Z-cut $LiNbO_3$ substrate, having an electrooptical effect, provides a broadband low drive voltage modulator.

More specifically, an optical waveguide 11 has a first cascading portion 11a and a second cascading portion 11b and is formed in the substrate, so that an optical field is transmitted through the optical waveguide 11. On the optical waveguide 11, first and second coplanar strip electrodes 12 and 13 are formed. Specifically, the first coplanar strip electrode 12 has a first part over the first cascading portion 11a of the optical waveguide 11 and second and third parts to extend beyond the first cascading portion 11a. The first part is approximately perpendicular to the second and third parts. Similarly, the second coplanar strip electrode 13 has a first part over the second cascading portion 11b of the optical waveguide 11 and second and third parts to extend beyond the second cascading portion 11b. The first part is approximately perpendicular to the second and third parts. The first parts of the first and second coplanar strip electrodes 12 and 13 have widths substantially the same as the first and second cascading portions 11a and 11b, respectively. The first coplanar strip electrode is symmetric to the second strip electrode.

A voltage source (not shown) will supply a voltage to the first coplanar strip electrode 12 while the second coplanar strip electrode 13 is grounded.

Figure 2:
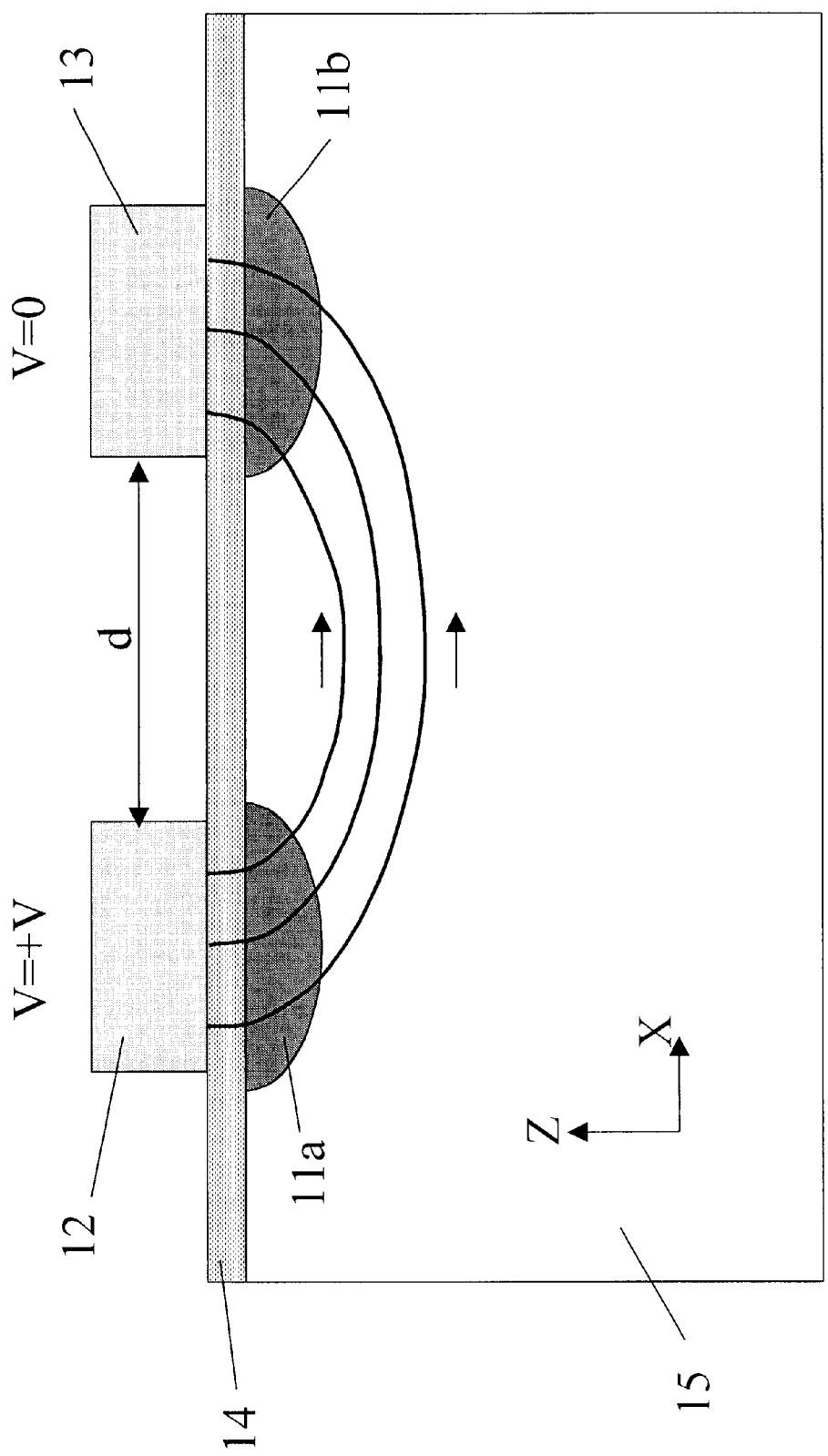
FIG. 2 is a cross-sectional view taken along the line II—II' of FIG. 1 illustrating the Mach Zehnder interferometer type modulator of the present invention.

FIG. 2 is a cross-sectional view taken along the line II–II' in FIG. 1. As shown in FIG. 2, a buffer layer 14, for example, a SiO$_2$ layer, is formed between the optical waveguide and the substrate 15. The first and second coplanar strip electrodes 12 and 13 substantially overlap the first and second cascading portions 11a and 11b, respectively, and the first coplanar strip electrode 12 has a width the same as the second coplanar strip electrode 13. Thus, electrooptic overlap integrals of each cascading portion of the optical waveguide become the same. In this case, the overlap integral is the spatial integral of the optical intensity times the vertical component of the applied electric field, typically normalized to an applied voltage of 1 volt, and to an integrated optical intensity of unity. In this configuration, the coplanar strip electrodes are identical and symmetrical so that equal and opposite Z-directed fields may be applied to each cascading portion of the optical waveguide 11. Due to symmetry, the overlap integrals will become identical with each other. Thus, a chirpless system can be acquired by implementing the present invention.

In this embodiment, a 50 Ω electrode structure that is velocity matched to optical modes in LiNbO$_3$ can readily be designed. For example, when an electrode width is 5 to 10 μm and a gap between the interferometer arms is 10 to 50 μm, an electrode thickness of 10 to 50 μm and a SiO$_2$ buffer layer thicknesses of 0.25 to 1.5 μm provide a desirable condition for systems operated at 1.3 or 1.55 μm wavelength. Further, the second and third parts of the first and second coplanar strip electrodes may be formed to be tapered to have first and second ends. The first end of the second and third parts of each coplanar strip electrode has a width substantially the same as the first part of each coplanar strip electrode, while the second end of the second and third parts of each coplanar strip electrode has a width substantially greater than the first part of each coplanar strip electrode. Typically, the second ends of the first and second coplanar strip electrodes have widths of 50 to 500 μm and 100 μm to a few mm, respectively. The distance between the second ends is about 100 to 1000 μm. The first and second coplanar strip electrodes are connected through a terminating resistor.

Figures 3A, 3B, 3C:
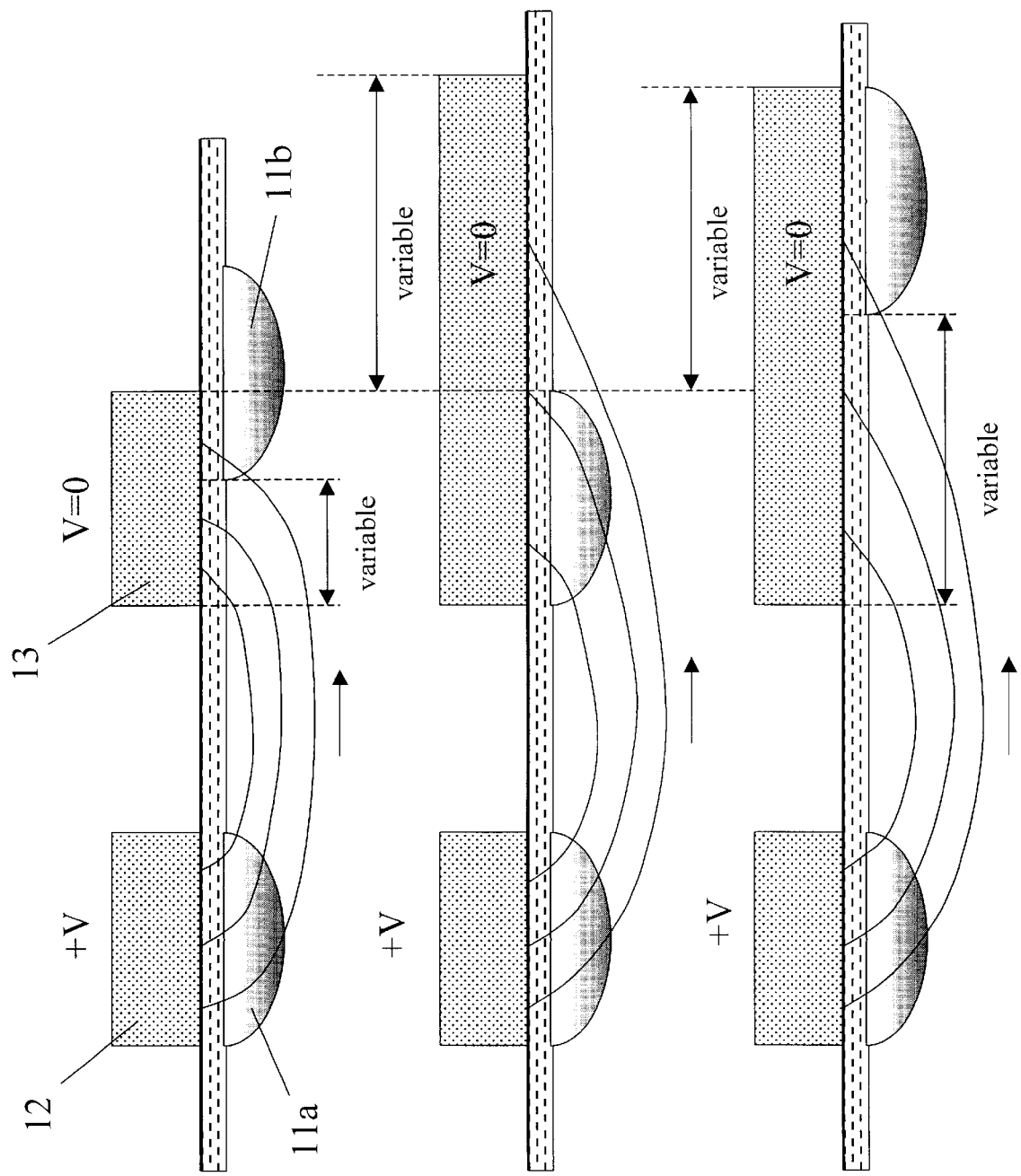
FIGS. 3A to 3C are cross-sectional views illustrating a Mach Zehnder interferometer type modulator having a two coplanar strip electrode structure for a fixed non-zero amount of a modulation chirp parameter according to a second embodiment of the present invention.

Alternatively, geometric variations of coplanar strip electrodes can also provide fixed values of non-zero chirp, as shown in FIGS. 3A to 3C. Fixed values of non-zero chirp can be obtained by moving one of the optical waveguides relative to the associated electrode, thus reducing the overlap of the electrical and optical fields. For example, the first coplanar strip electrode 12 completely overlaps the first cascading portion 11a while the second coplanar strip electrode 13 partially overlaps the second cascading portion 11b of the optical waveguide. This is shown in FIG. 3A.

Another approach would be to increase a width of the ground electrode, the second coplanar strip electrode 13, as shown in FIG. 3B. This configuration allows the field at the ground electrode 13 to spread out, thereby reducing the field at the optical waveguide 11b. To further reduce the overlap, the approaches of FIGS. 3A and 3B can be applied simultaneously, as shown in FIG. 3C. By using one or more of these approaches, the overlap can be varied from its maximum value to zero. Under these circumstances, a chirp parameter α is given by the following equations.

$$\alpha = \left(\frac{\Gamma_b - \Gamma_a}{\Gamma_a + \Gamma_b}\right)\cot\left[\frac{(\Gamma_a + \Gamma_b)}{2}\eta V\right] \quad (1)$$

where $$\eta = \Pi L n_e^3 r_{33}/\lambda_0 d \quad (2)$$

Here, a and b refer to the first and second cascading portions (the arms of the optical waveguide). Γ is an electro-optic overlap integral at each arm, and V is a voltage applied to the electrode above arm a. L is an electrode length, d an electrode inner edge separation, $n_e$ the LiNbO$_3$ refractive index, and $r_{33}$ an electro-optic coefficient. λ is the free-space optical wavelength. As shown in equation (1), α=0 for $\Gamma_a = \Gamma_b$.

For an applied voltage given by $$V = V_0 \sin(\omega t) + V_b \quad (3)$$

where $V_b$ is a DC bias voltage, the interferometer is set at the quadrature bias by adjusting $V_b$ to obtain $$(\Gamma_a + \Gamma_b)\eta V_b = \pm \Pi/2 \quad (4)$$

The sign of the chirp parameter can be varied by changing the sign of $V_b$, which changes the sign of the phase difference used to achieve the bias. In other words, the phase bias is changed from +Π/2 to −Π/2). This can be shown for small signals, with $V_0 \to 0$, near the quadrature, by substituting equation (4) into equation (1).

$$\alpha = \pm\left(\frac{\Gamma_b - \Gamma_a}{\Gamma_a + \Gamma_b}\right) \quad (5)$$

Using this approach, fixed chirp values can be obtained in the range of −1<α<+1.

It is apparent from equations (1) and (3) that small variations of the chirp parameter about its fixed value can be obtained by small variations of the bias voltage $V_b$ about that value needed to obtain quadrature, given by equation (4). This will cause slight departures from linearity, but to some extent may be acceptable in a digital system.

The present invention is appropriate to Z-cut LiNbO$_3$ because it utilizes the vertical component of the electric field. This orientation is advantageous because lower drive voltages typically are obtained with a Z-axis orientation. This embodiment requires only a single drive from a single source, as opposed to a dual drive configuration with signals out of phase by some preset amounts. Thus, the embodiment can be implemented with a single RF input connector.

Fixed non-zero chirp values between −1<α<+1 can easily be obtained by adjusting the geometry. Some variations of the chirp parameter can be achieved by small variations of the bias voltage around the quadrature. Further, the embodiment may be applied to any material systems in which vertically directed fields are employed. A voltage may be applied to either electrode in FIG. 1, so that either electrode may be grounded. In addition, the electrode structure can also be used with a dual output Mach Zehnder interferometer. Thus, Mach Zehnder interferometers may be combined with a 3-dB directional coupler output.

Figure 4:
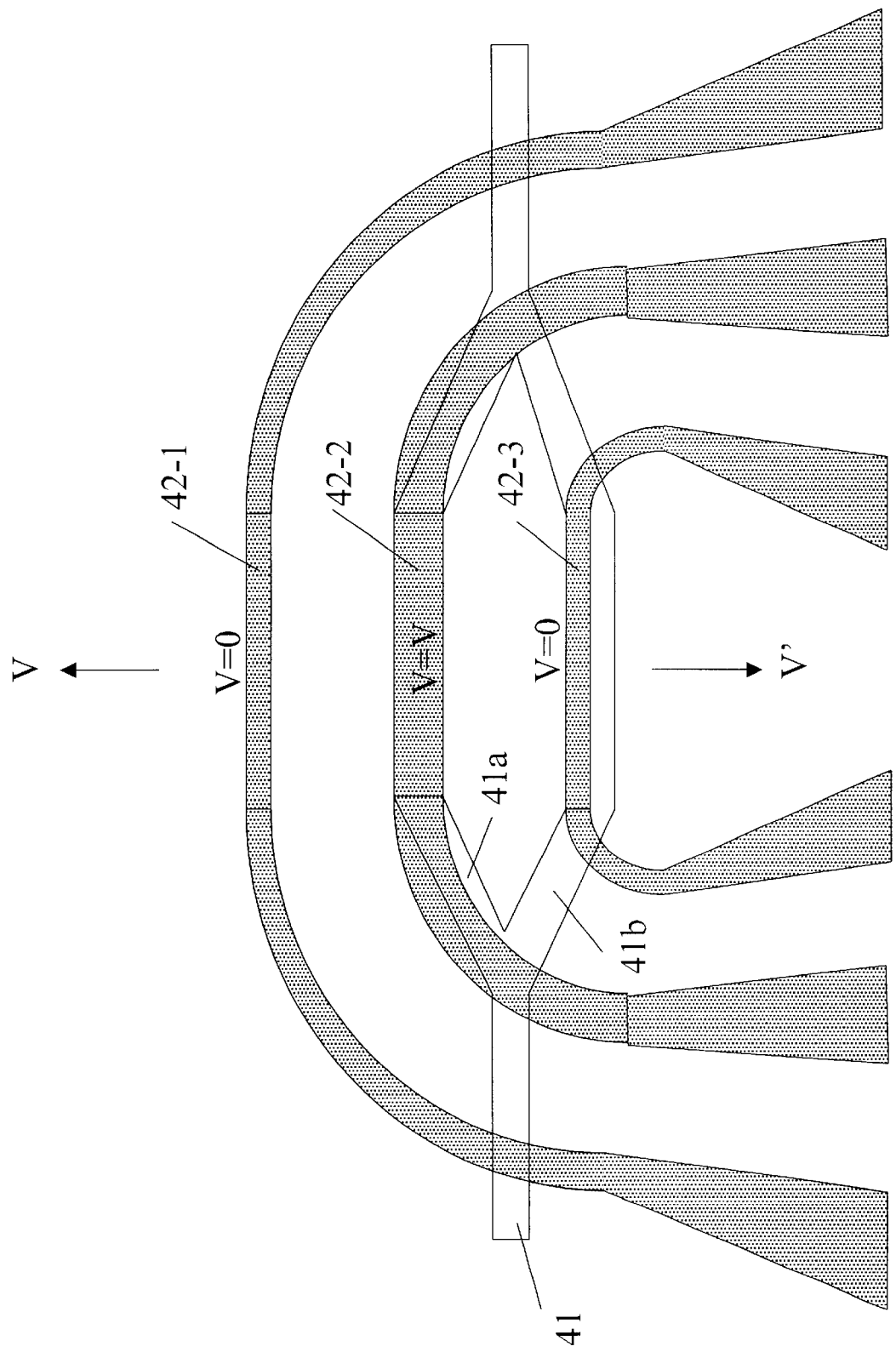
FIG. 4 is a top view of a Mach Zehnder interferometer type modulator having a three coplanar waveguide electrode structure driven by a single drive voltage for a fixed non-zero amount of a modulation chirp parameter according to a third embodiment of the present invention.
Figure 5:
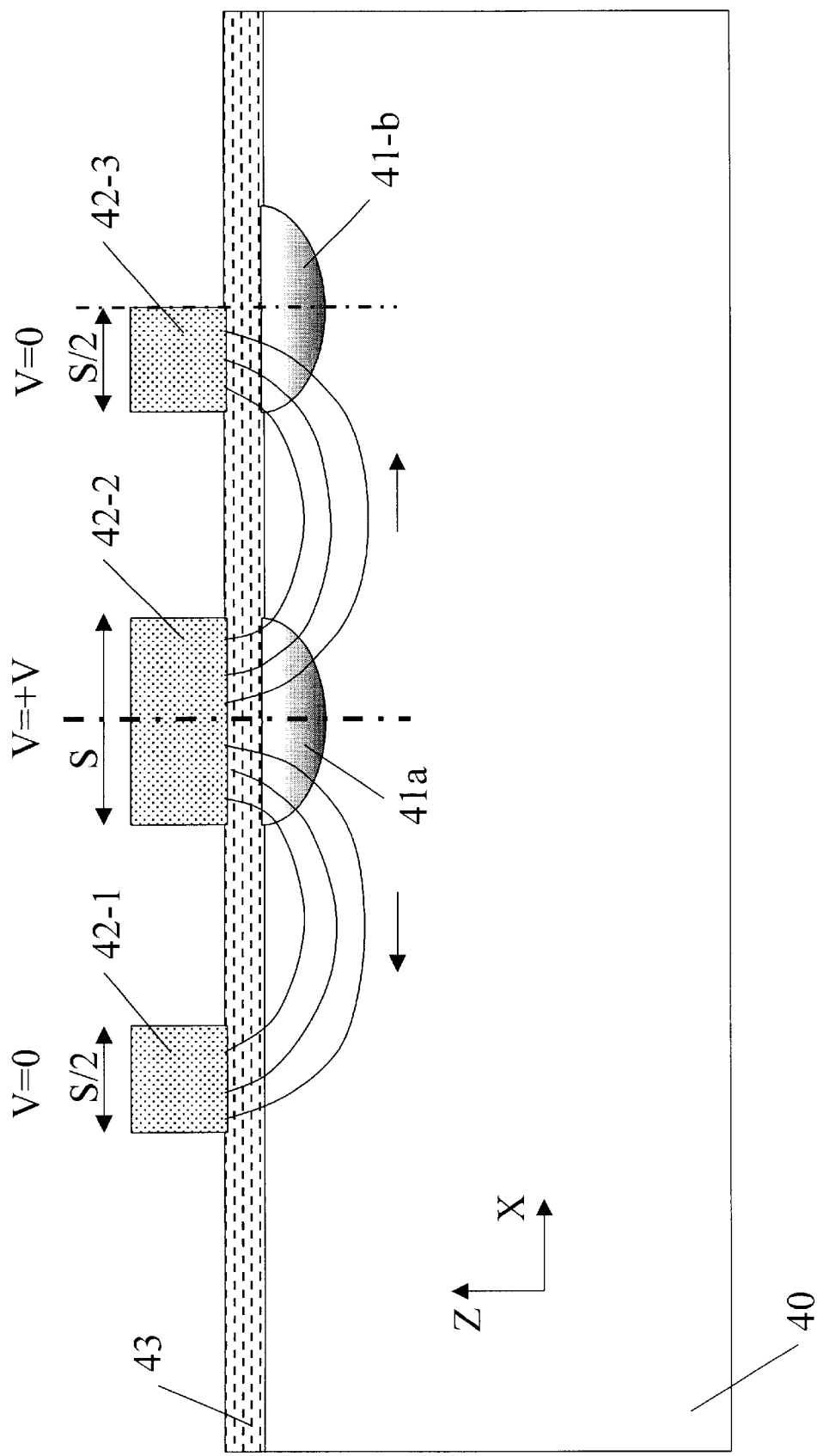
FIG. 5 is a cross-sectional view taken along the line V–V' of FIG. 4 illustrating the Mach Zehnder interferometer type modulator of the present invention.

FIGS. 4 to 6 illustrate a Mach Zehnder interferometer type modulator having a three coplanar waveguide electrode structure driven by a single drive voltage for a fixed non-zero amount of a modulation chrip parameter according to third and fourth embodiments of the present invention. In these embodiments, the configuration is designed by using two symmetric ground electrodes 42-1 and 42-3 and a hot electrode 42-2 to generate a fixed non-zero amount of a modulation chirp parameter. For example, the ratio of the electrooptic overlap integrals $\Gamma_b/\Gamma_a$ is in the range between 0.5 and 0, so that the fixed non-zero amount of a modulation chirp parameter may be in the range between −0.33 and −1 or between 0.33 and 1.

In the third embodiment of FIGS. 4 and 5, a substrate 40, an optical waveguide 41 including first and second cascading portions 41a and 41b, and a buffer layer 43 are similar to the other embodiments except for an electrode structure. Accordingly, a detailed description is omitted in this embodiment for simplicity. In this embodiment, the hot electrode 42-2 is placed on the first cascading waveguide 41a. The widths of the two symmetric ground electrodes 42-1 and 42-3 are reduced to one half of the width of the hot electrode 42-2. The ground electrode 42-3 is placed asymmetrically on the second cascading waveguide 41b such that it occupies the half space (defined by a vertical dotted center line through the cascading waveguide 41b), closer to the hot electrode 42-2. For this configuration, the overlap integral $\Gamma_b$ associated with the second cascading waveguide 41b is one half of the the overlap integral $\Gamma_a$ associated with the first cascading waveguide 41a. The resulting fixed value of non-zero chirp parameter is ±0.33.

Figures 6A, 6B, 6C:
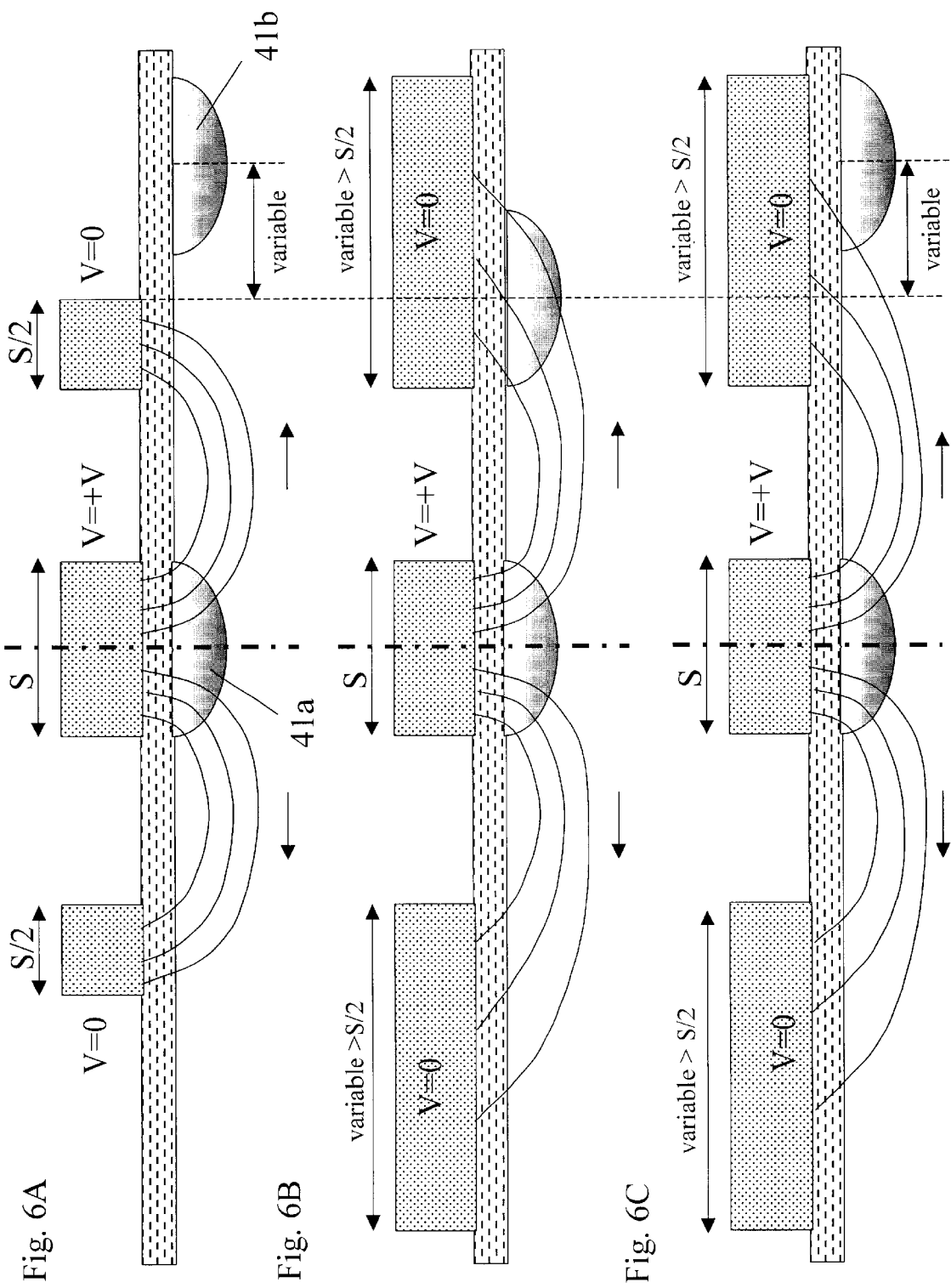
FIGS. 6A to 6C are cross-sectional views of a Mach Zehnder interferometer type modulator having a three coplanar waveguide electrode structure for a fixed non-zero amount of a modulation chirp parameter according to a fourth embodiment of the present invention.

Other values of fixed non-zero chirp parameter may be achieved by further reduction of the overlap integral $\Gamma_b$. In FIG. 6A, this is achieved by moving the second cascading waveguide 41b out of the electric field by a variable amount to the x-direction. In FIG. 6B, the width of the ground electrodes 42-1 and 42-3 are increased to be greater than S/2 by a variable amount. In FIG. 6C, both of these approaches are applied simultaneously. With these means, the ratio of overlap integrals $\Gamma_b/\Gamma_a$ may be varied from 0.5 to 0. The corresponding values of chirp parameter vary from 0.33 to 1, or from −0.33 to −1.

The third and fourth embodiments shown in FIGS. 4 to 6 require only a single drive voltage. Also, the input signal does not have to be divided in two, so that driving two coplanar waveguide structures is not required.

In the third and fourth embodiments, a 50 Ω electrode structure that is velocity matched to optical modes in LiNbO$_3$ can readily be designed. For example, a width of the hot electrode is 5 to 10 μm while a gap between the interferometer arms (the first and second cascading portions 41a and 41b of the optical waveguide) is 10 to 50 μm. A spacing between the electrodes is also about 10 to 50 μm. An electrode thickness is between 10 to 50 μm and a SiO$_2$ buffer layer has a thickness of 0.25 to 1.5 μm. In the third embodiment, the ground electrode width is about one half of the hot electrode width while the ground electrode in the fourth embodiment (FIGS. 6B and 6C) has a width in the range of 2.5 μm to a few mm.

Further, the second and third parts of the hot electrode 42-2 and the symmetric ground electrodes 42-1 and 42-3 may be formed to be tapered to have first and second ends. The first ends of each coplanar waveguide electrode have a width substantially the same as the first part of each coplanar waveguide electrode, while the second ends of each coplanar waveguide electrode have a width substantially greater than the first ends of each coplanar waveguide electrode. Typically, the second ends of the second, and the first and third, coplanar waveguide electrodes have widths of 50 to 500 μm and 100 μm to a few mm, respectively, so that an electrical connection may be attached on the second end. A spacing between the second ends of the electrodes is in the range of 100 to 1000 μm. The first and third coplanar waveguide electrodes are connected to the second coplanar waveguide electrode through a terminating resistor.

Figure 7:
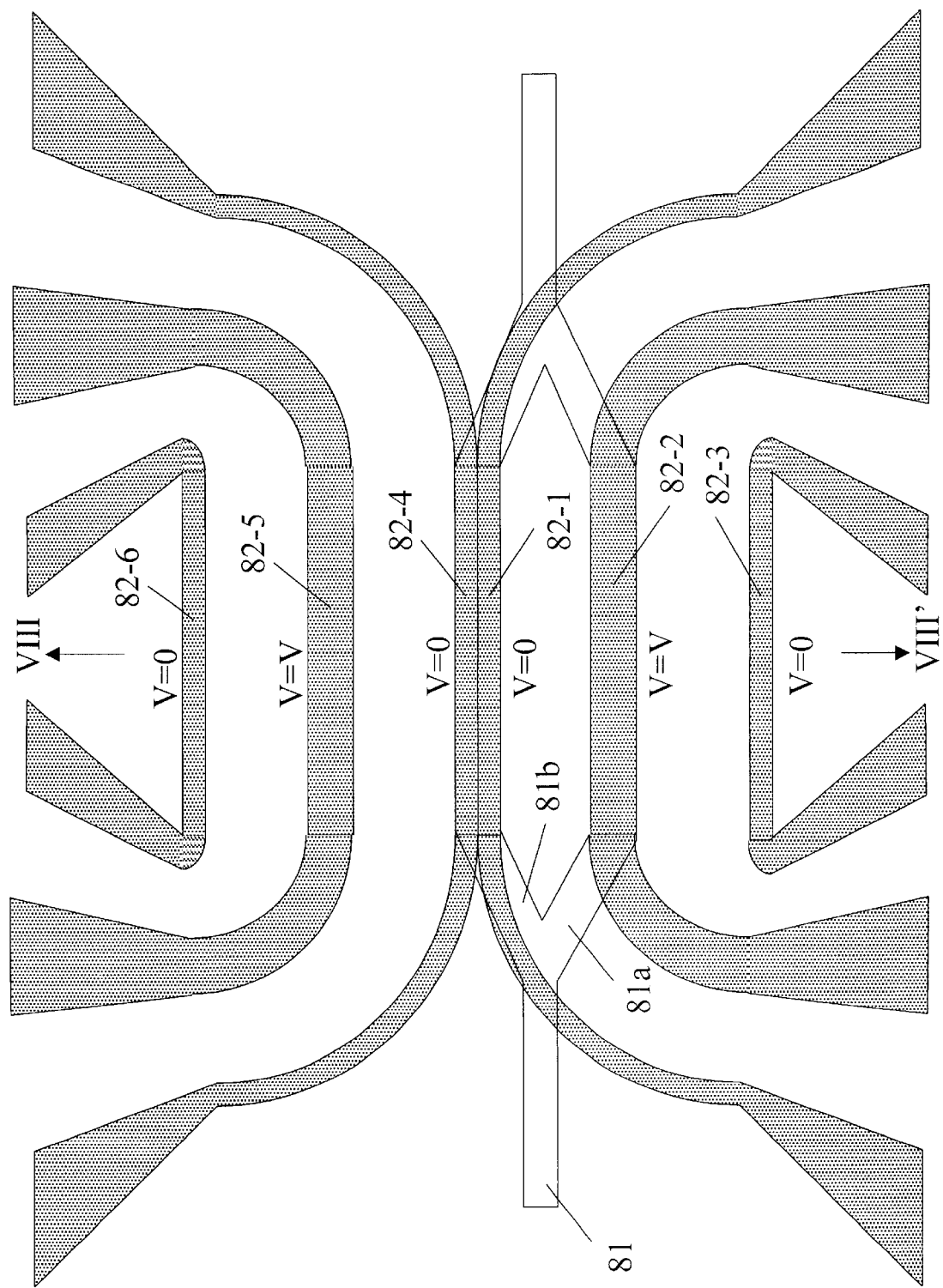
FIG. 7 is a top view of a Mach Zehnder interferometer type modulator having a six coplanar waveguide electrode structure driven by two drive voltages for a zero amount of a modulation chirp parameter according to a fifth embodiment of the present invention.
Figure 8:
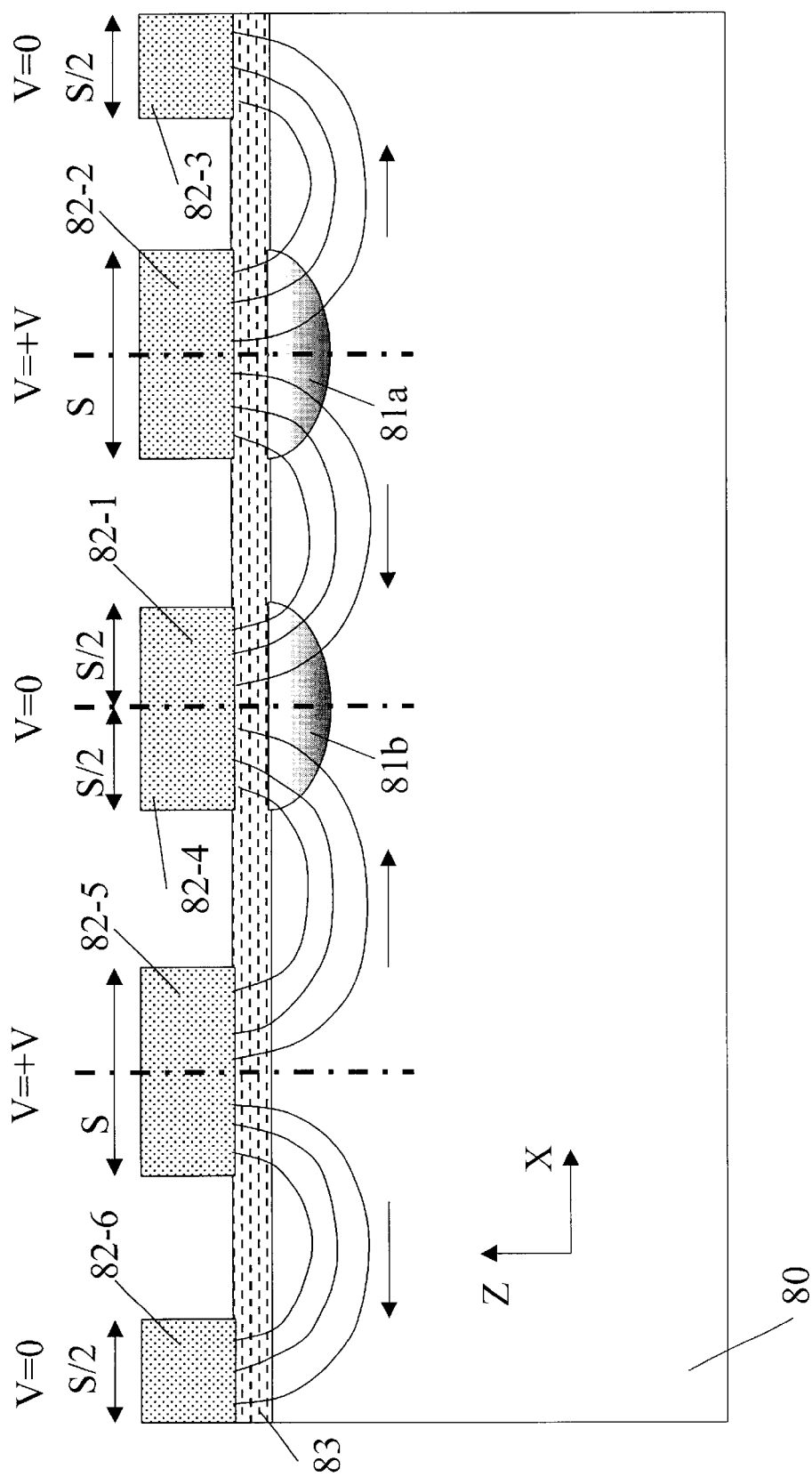
FIG. 8 is a cross-sectional view taken along the line VIII–VIII' of FIG. 7 illustrating the Mach Zehnder interferometer type modulator of the present invention.
Figure 9:
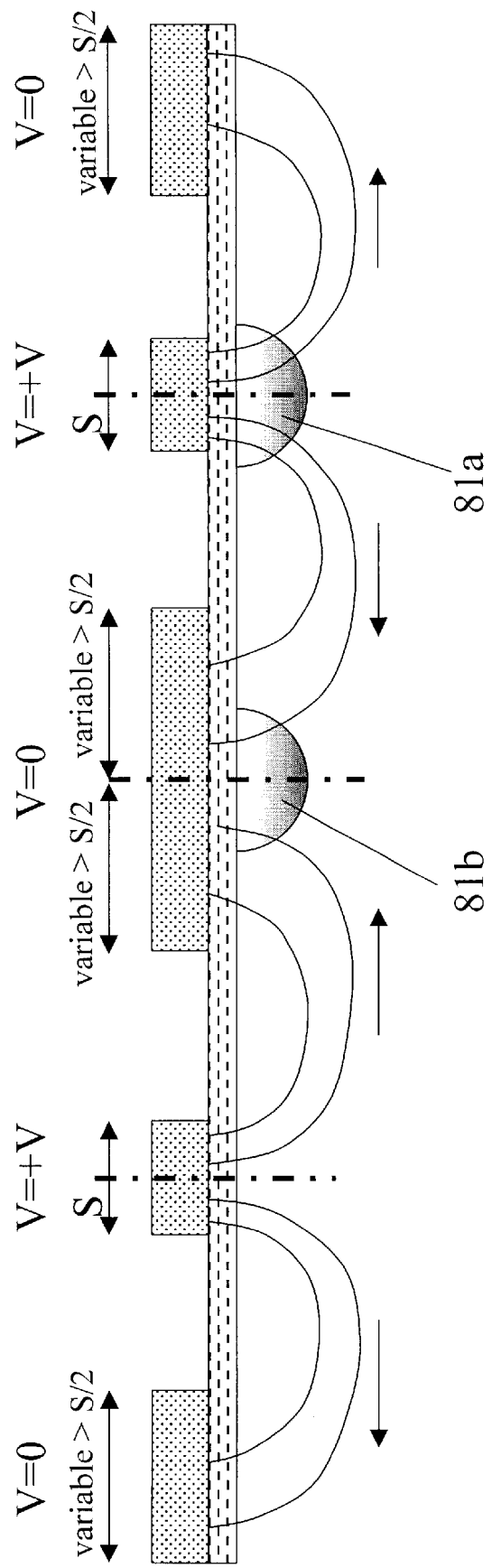
FIG. 9 is a cross-sectional view illustrating a Mach Zehnder interferometer type modulator having a six coplanar waveguide electrode structure driven by two drive voltages for a fixed non-zero chirp according to a sixth embodiment of the present invention.

FIGS. 7 to 9 illustrate a Mach Zehnder interferometer type modulator having a six coplanar waveguide electrode structure driven by two drive voltages according to fifth and sixth embodiments of the present invention. In the fifth embodiment shown in FIGS. 7 and 8, a zero amount of a modulation parameter is obtained whereas a fixed non-zero amount of a modulation parameter is achieved in the sixth embodiment as shown in FIG. 9. In these embodiments, each structure is driven with the same signal with equal amplitude and phase. The structure is equivalent to two coupled microwave waveguides excited by the symmetric normal mode. Since it is always excited by only the symmetric mode, a modal dispersion effect does not occur in the present invention.

Specifically, the optical modulator shown in FIGS. 7 to 8 has the following detailed configuration. The optical modulator has a substrate 80 having an electrooptic effect, such as Z-cut LiNbO$_3$. An optical waveguide has first and second cascading portions 81a and 81b in the substrate 80 for transmitting an optical field. A first coplanar waveguide electrode 82-1 has a first part over the second cascading portion 81b and second and third parts extending beyond the first cascading portion 81a, and the first part is approximately perpendicular to the second and third parts. A second coplanar waveguide electrode 82-2 has a first part over the first cascading portion 81a and second and third parts extending beyond the first cascading portion 81a, and the first part is approximately perpendicular to the second and third parts. A third coplanar waveguide electrode 82-3 has a shape symmetric to the first coplanar waveguide electrode 82-1, and separated apart from the second coplanar waveguide electrode 82-2 by a distance the same as the distance between the first and second coplanar waveguide electrodes 82-1 and 82-2. A fourth coplanar waveguide electrode 82-4 has a shape symmetric to the first coplanar waveguide electrode 82-1, and has a first part over the second cascading portion 81b to be in contact with the first part of the first coplanar waveguide electrode 82-1. A fifth coplanar waveguide electrode 82-5 has a shape symmetric to the second coplanar waveguide electrode 82-2 and separated apart from the fourth coplanar waveguide electrode 82-4 the same as the distance between the first and second coplanar waveguide electrodes 82-1 and 82-2. Similarly, a sixth coplanar waveguide electrode 82-6 has a shape symmetric to the third coplanar waveguide electrode 82-3 and separated apart from the fifth coplanar waveguide electrode 82-5 the same as the distance between the second and third coplanar waveguide electrodes 82-2 and 82-3. A voltage source (not shown) supplies identical voltage to each of the second and fifth coplanar waveguide electrodes 82-2 and 82-5. The first, third, fourth, and sixth coplanar waveguide electrodes 82-1, 82-3, 82-4, and 82-6 are grounded in the present invention.

In the fifth embodiment of FIGS. 7 and 8, the first parts of the first, third, fourth, and sixth coplanar waveguide electrodes 82-1, 82-3, 82-4, and 82-6 are half as wide as those of the second and fifth coplanar waveguide electrodes 82-2 and 82-5. Thus, electrooptic overlap integrals of each cascading portion of the optical waveguide 81 are the same, so that a zero amount of a modulation chirp parameter is obtained in FIGS. 7 and 8. The direction of electric fields shown as arrows in FIG. 8 is with the application of positive voltages to 82-2 and 82-5.

The resultant coplanar waveguide electrodes above the cascading portions 81a and 81b are identical and symmetrical, so that equal and opposite Z-directed fields may be applied to each cascading portion of the optical waveguide 81. Due to symmetry, the overlap integrals will become identical with each other. Thus, a chirpless system can be obtained by implementing the present invention.

A buffer layer 83, such as $SiO_2$, may be formed on the substrate 80, as shown in FIG. 8. In this embodiment, a 50 Ω electrode structure that is velocity matched to optical modes in $LiNbO_3$ can readily be designed. For example, widths of the first parts of the hot electrodes are about 5 to 10 $\mu$m and distances between the hot electrodes and the ground electrodes are 10 to 50 $\mu$m. An electrode thickness is in the range of 10 to 50 $\mu$m and a $SiO_2$ buffer layer has a thickness of 0.25 to 1.5 $\mu$m.

Moreover, the second and third parts of the first, second, third, fourth, fifth, and sixth coplanar waveguide electrodes may be formed to be tapered to have first and second ends. Thus, the first end has a width substantially the same as the first part, and the second end has a width substantially greater than the first end. For example, the second ends of the second and third parts of the ground electrodes and the hot electrodes are about 100 $\mu$m to a few mm and 50 to 500 $\mu$m, respectively. The second and the fifth coplanar waveguide electrodes are connected to the first and the third, and to the fourth and the sixth, coplanar waveguide electrodes respectively, through terminating resistors.

As shown in FIG. 9 according to the sixth embodiment of the present invention, when the first parts of the first, third, fourth, and sixth coplanar waveguide electrodes 82-1, 82-3, 82-4, and 82-6 have a width greater than one half the width of the second and fifth coplanar waveguide electrodes 82-2 and 82-5, a fixed non-zero chirp value may be obtained. In this embodiment, fixed values of non-zero amount of a modulation chirp parameter is obtained by reducing the overlap $\Gamma_b$ at the waveguide 81b. The value for the ratio of the electrooptic overlap integrals $\Gamma_b/\Gamma_a$ can be varied in the range between 0 and 1, so that the fixed non-zero amount of modulation chirp parameter is in the range between ±1 and 0.

As described above, the optical modulator of the present invention has the following advantages. Since a zero chirp with two in-phase signals is achieved, inverting one of the signals is not necessary. In addition, since the symmetrically driven coplanar waveguides are coupled, the waveguides do not need to be separated by some large distance to accomplish electrically independent coplanar waveguides. In other words, interferometer arms do not need to be separated by a large distance which requires a large substrate length, so that the overall length required for the modualtor can be reduced. Alternatively, the electrode length can be increased, resulting in lower drive voltage with the same overall device size.

It will be apparent to those skilled in the art that various modifications and variations can be made in the optical modulator having coplanar electrodes for controlling a chirp of the present invention without departing from the spirit or scope of the inventions. Thus, it is intended that the present invention cover the modifications and variations of this invention provided they come within the scope of the appended claims and their equivalents.

What is claimed is:

1. An optical modulator, comprising:

a substrate having an electrooptic effect;

an optical waveguide having first and second cascading portions in the substrate, and transmitting an optical field;

a first coplanar waveguide electrode having a first part over the second cascading portion and second and third parts extending beyond the second cascading portion, wherein the first part is approximately perpendicular to the second and third parts;

a second coplanar waveguide electrode having a first part over the first cascading portion and second and third parts extending beyond the first cascading portion, wherein the first part is approximately perpendicular to the second and third parts;

a third coplanar waveguide electrode having a shape symmetric to the first coplanar waveguide electrode and separated apart from the second coplanar waveguide electrode by a distance the same as the distance between the first and second coplanar waveguide electrodes;

a fourth coplanar waveguide electrode having a shape symmetric to the first coplanar waveguide electrode, and having a first part over the second cascading portion and being in contact with the first part of the first coplanar waveguide electrode;

a fifth coplanar waveguide electrode having a shape symmetric to the second coplanar waveguide electrode and separated apart from the fourth coplanar waveguide electrode by a distance the same as the distance between the first and second coplanar waveguide electrodes;

a sixth coplanar waveguide electrode having a shape symmetric to the third coplanar waveguide electrode and separated apart from the fifth coplanar waveguide electrode by a distance the same as the distance between the second and third coplanar waveguide electrodes; and a voltage source supplying a voltage to the second and fifth coplanar waveguide electrodes, wherein the first, third, fourth, and sixth coplanar waveguide electrodes are grounded.

2. The optical modulator according to claim 1, wherein the first parts of each of the first, third, fourth, and sixth coplanar waveguide electrodes have a width which is half of those of the second and fifth coplanar waveguide electrodes, so that electrooptic overlap integrals of each cascading portion of the optical waveguide are the same, thereby generating a zero amount of a modulation chirp parameter.

3. The optical modulator according to claim 1, wherein the first parts of the first, third, fourth, and sixth coplanar waveguide electrodes have a width greater than one half of a width of the second and fifth coplanar waveguide electrodes, so that electrooptic overlap integrals of each cascading portion of the optical waveguide are different, thereby generating a fixed non-zero amount of a modulation chirp parameter.

4. The optical modulator according to claim 1, wherein the second and third parts of the first to sixth coplanar waveguide electrodes are formed to have first and second ends, so that the first end has a width substantially the same as the first part and the second end has a width greater than the first end.

5. The optical modulator according to claim 1, wherein the substrate includes Z-cut $LiNbO_3$.

6. The optical modulator according to claim 1, further comprising a buffer layer on the substrate including the optical waveguide.

7. The optical modulator according to claim 6, wherein the buffer layer is formed of $SiO_2$.

8. The optical modulator according to claim 6, wherein the buffer layer has a thickness in the range of 0.25 to 1.5 µm.

9. The optical modulator according to claim 1, wherein the first parts of the first to sixth coplanar waveguide electrodes have a width of 2.5 to 10 µm and a thickness in the range of 10 to 50 µm, and are separated from one another by 10 to 50 µm when a signal transmission wavelength is 1.3 µm or 1.55 µm.

10. The optical modulator according to claim 1, wherein the first to third coplanar waveguide electrodes and the fourth to sixth coplanar waveguide electrodes are each formed to have an impedance of about 50 Ω.

11. The optical modulator according to claim 1, wherein the first to third coplanar waveguide electrodes are connected to one another through a first terminating resistor and the fourth to sixth coplanar waveguide electrodes are connected to one another through a second terminating resistor.

12. The optical modulator according to claim 3, wherein the fixed non-zero amount of a modulation chirp parameter is in the ranges between −1 and 0 and 0 and 1, when a ratio of the electrooptic overlap integrals is in the range between 0 and 1.

* * * * *